No. 773,272. PATENTED OCT. 25, 1904.
A. M. BALDWIN.
KETTLE STEAMER.
APPLICATION FILED MAR. 25, 1904.
NO MODEL.

Witnesses.

Inventor.
A. M. Baldwin

No. 773,272. Patented October 25, 1904.

UNITED STATES PATENT OFFICE.

ADELE MARY BALDWIN, OF TORONTO, CANADA.

KETTLE-STEAMER.

SPECIFICATION forming part of Letters Patent No. 773,272, dated October 25, 1904.

Application filed March 25, 1904. Serial No. 199,991. (No model.)

*To all whom it may concern:*

Be it known that I, ADELE MARY BALDWIN, gentlewoman, of the city of Toronto, in the county of York, in the Province of Ontario, Canada, have invented certain new and useful Improvements in Kettle-Steamers, of which the following is a specification.

My invention relates to improvements in kettle-steamers; and the object of the invention is to devise a simple form of steamer adaptable to a kettle by which crumpets, a late meal, a poultice for a sick-room, or victuals, &c., may be kept hot and moist without the necessity of employing a special pot or utensil, for the reason that the water in the kettle is always boiling and is instantly available, and by such a device economize as to expense, avoid additional trouble and consequent loss of time and space; and it consists, essentially, of a steamer formed, preferably, with a sharp depending tapered portion, a cylindrical portion depending therefrom, and a second reduced tapered portion depending from the cylindrical portion, the steamer being otherwise arranged and constructed as hereinafter more particularly explained.

Figure 1:
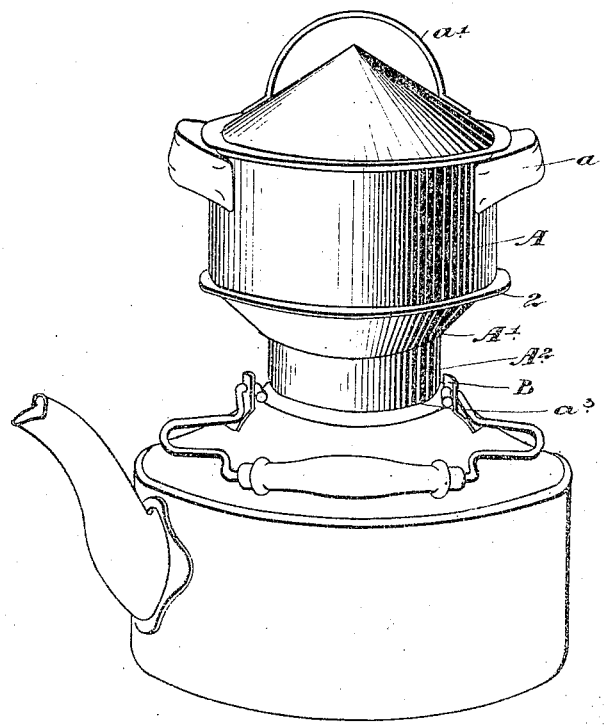
Figure 2:
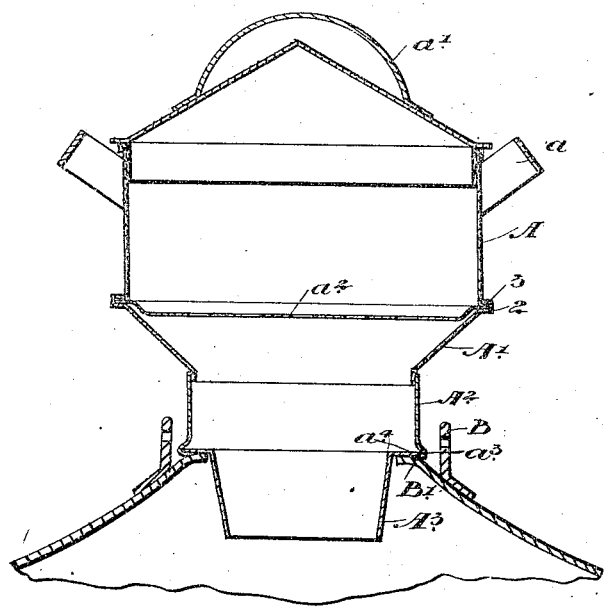

Figure 1 represents a perspective view of a kettle, showing my improved steamer in position. Fig. 2 is an enlarged sectional detail of the steamer and portion of the kettle.

In the drawings like letters of reference indicate corresponding parts in each figure.

A is the steamer, which is provided with the usual handles $a$ and $a'$ and perforated bottom $a^2$. The steamer A is provided, preferably, with a sharply-tapered portion $A'$, which is formed with a U-shaped annular top rim 2, which fits the ordinary rim 3, formed at the bottom of the main body. The cylindrical portion $A^2$ is suitably soldered at the top to the bottom rim of the tapered portion $A'$ and is formed at the bottom with a strengthening-rim $a^3$ and inwardly-extending ledge $a^4$, from which extends the reduced tapered portion $A^3$. It will be noticed that the portion $A^2$ extends upwardly above the ears B, on which is pivotally swung the bail of the kettle. The portion $A^2$ is specially designed and made of such a height that the steamer may be placed in position within the ears and down tight into the opening at the top of the kettle. The ledge $a^3$ serves to form a secure base on the top ledge $B'$ of the opening of the kettle, the lid of which of course is removed in order to place my device in position. The portion $A^3$ is made tapered, so that it will fit the different-sized openings in kettles.

Such a steamer as I describe, which is especially adaptable for kettles, in which, as is well known, the water is kept boiling or nearly so, will be found very useful, especially in small families or where economy is much desired. Even in wealthier families the utility of the device is unquestionable, as muffins and other victuals which it is necessary to keep hot will be kept so in my steamer without the necessity of employing a separate pot and steamer on the stove. It will also be understood that my device will be especially adaptable in keeping poultices warm or for late meals and may be applied to many other uses which it is not necessary here to enumerate.

What I claim as my invention is—

A kettle-steamer comprising the main body having a perforated bottom and the sharply-tapered depending bottom portion connected to the bottom rim of the main body, the cylindrical portion forming a combination thereof and having an inwardly-projecting ledge and the reduced tapered portion extending downwardly from the inner edge of the ledge into the opening in the kettle as and for the purpose specified.

ADELE MARY BALDWIN.

Witnesses:
  B. BOYD,
  M. McLAREN.